(12) United States Patent
Zhang et al.

(10) Patent No.: US 11,423,222 B2
(45) Date of Patent: Aug. 23, 2022

(54) METHOD AND APPARATUS FOR TEXT ERROR CORRECTION, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Ruiqing Zhang, Beijing (CN); Chuanqiang Zhang, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/243,097

(22) Filed: Apr. 28, 2021

(65) Prior Publication Data
US 2021/0248309 A1   Aug. 12, 2021

(30) Foreign Application Priority Data

Dec. 11, 2020   (CN) .......................... 202011442447.6

(51) Int. Cl.
*G06F 40/232*   (2020.01)
*G06N 20/00*   (2019.01)
*G06F 40/279*   (2020.01)
*G06F 40/166*   (2020.01)

(52) U.S. Cl.
CPC .......... *G06F 40/232* (2020.01); *G06F 40/166* (2020.01); *G06F 40/279* (2020.01); *G06N 20/00* (2019.01)

(58) Field of Classification Search
CPC .... G06F 40/232; G06F 40/166; G06F 40/279; G06N 20/00
See application file for complete search history.

(56) References Cited

FOREIGN PATENT DOCUMENTS

| CN | 110032722 A |   | 7/2019  |
|----|-------------|---|---------|
| CN | 110765772 A |   | 2/2020  |
| CN | 111523306 A |   | 8/2020  |
| CN | 111783433 A |   | 10/2020 |
| CN | 111859921 A | * | 10/2020 |
| CN | 111985213 A | * | 11/2020 |
| CN | 111985213 A |   | 11/2020 |
| CN | 111985234 A |   | 11/2020 |

OTHER PUBLICATIONS

Office Action for Chinese Application No. 202011442447.6, dated Jan. 25, 2021, 15 pages.

* cited by examiner

*Primary Examiner* — Scott T Baderman
*Assistant Examiner* — Seung Woon Jung
(74) *Attorney, Agent, or Firm* — Fay Sharpe LLP

(57) ABSTRACT

A method for text error correction includes: obtaining a text to be corrected; obtaining a pinyin sequence of the text to be corrected; and inputting the text to be corrected and the pinyin sequence to a text error correction model, to obtain a corrected text.

12 Claims, 5 Drawing Sheets

METHOD AND APPARATUS FOR TEXT ERROR CORRECTION, ELECTRONIC DEVICE AND STORAGE MEDIUM

CROSS REFERENCE TO RELATED APPLICATION

This application is based upon and claims a priority to Chinese Patent Application Serial No. 202011442447.6, filed with the State Intellectual Property Office of P.R. China on Dec. 11, 2020, the entire contents of which are incorporated herein by reference.

TECHNICAL FIELD

The present disclosure relates to a field of artificial intelligence (AI) technologies such as natural language processing (NLP), deep learning (DL), etc., and particularly to a method and an apparatus for text error correction, an electronic device and a storage medium.

BACKGROUND

Text error correction is a process of correcting errors in a text. With the development of artificial intelligence (AI), text error correction has been changed from the initial manual error correction to the intelligent error correction. However, there is still no effective method for text error correction in the related art.

SUMMARY

According to one aspect of the present disclosure, a method for text error correction is provided. The method includes: obtaining a text to be corrected; obtaining a pinyin sequence of the text to be corrected; and inputting the text to be corrected and the pinyin sequence to a text error correction model, to obtain a corrected text.

According to another aspect of the present disclosure, an electronic device is provided. The electronic device includes: at least one processor; and a memory communicatively coupled to the at least one processor. The at least one processor is configured to obtain a text to be corrected; obtain a pinyin sequence of the text to be corrected; and input the text to be corrected and the pinyin sequence to a text error correction model, to obtain a corrected text.

According to another aspect of the present disclosure, a non-transitory computer-readable storage medium having computer instructions stored thereon is provided. The computer instructions are configured to cause a computer to execute a method for text error correction. The method includes: obtaining a text to be corrected; obtaining a pinyin sequence of the text to be corrected; and inputting the text to be corrected and the pinyin sequence to a text error correction model, to obtain a corrected text.

Other effects of the above alternative ways will be described below in combination with the specific embodiments.

BRIEF DESCRIPTION OF THE DRAWINGS

The drawings herein are intended to better understand the solution, and do not constitute a limitation to the disclosure.

DETAILED DESCRIPTION

Figure 1:
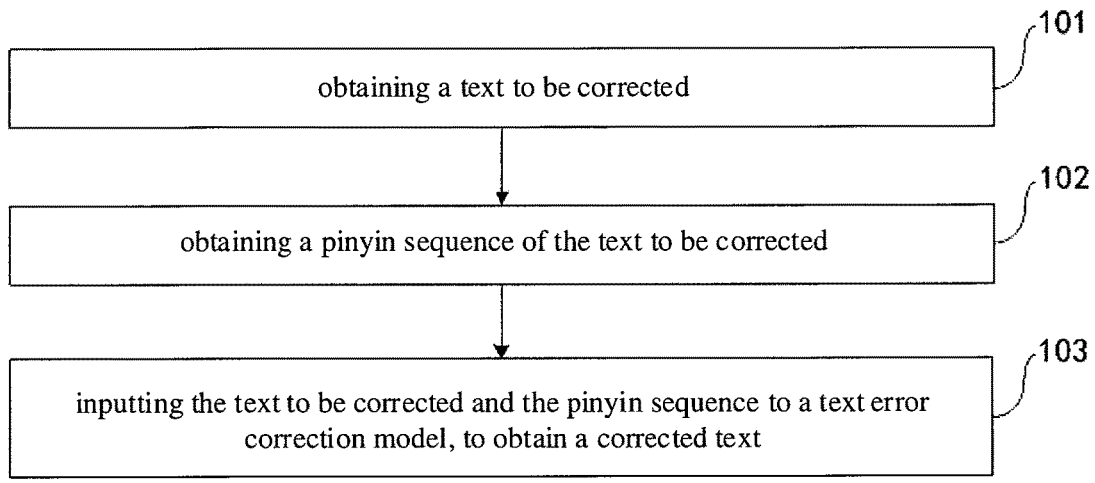
FIG. 1 is a flowchart illustrating a method for text error correction in embodiments of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope of the present disclosure. Similarly, for clarity and conciseness, descriptions of well-known functions and structures are omitted in the following descriptions.

A method and an apparatus for text error correction, an electronic device and a storage medium are described below with reference to accompanying drawings in embodiments of the present disclosure.

The Artificial intelligence (AI) is a subject that simulates certain thinking processes and intelligent behaviors (such as learning, reasoning, thinking, planning, etc.) of human beings by using a computer, which covers both hardware-level technologies and software-level technologies. The AI hardware technologies generally include technologies such as sensors, dedicated AI chips, cloud computing, distributed storage, big data processing, etc.; the AI software technologies include several directions such as a computer vision technology, a speech recognition technology, a natural language processing (NLP) technology, a deep learning (DL), a big data processing technology, a knowledge graph technology, etc.

The Natural language processing (NLP) is an important direction in the field of computer science and AI, which studies all kinds of theories and methods that may achieve effective communication between human and computer, by natural language. The NLP is a science that integrates linguistics, computer sciences, and mathematics.

The Deep learning (DL) is a new research direction in the field of machine learning. The DL learns inherent law and representation hierarchy of sample data, and information obtained in the learning process is of great help in interpretation of data such as words, images and sounds. Its final goal is that the machine may have an analytic learning ability like humans, which may recognize data such as words, images, sounds, etc. The DL is a complicated machine learning algorithm, which has far outperformed the related art in the speech and image recognition.

The method for text error correction in the embodiments of the present disclosure may be executed by an electronic device. The electronic device may be a personal computer (PC), a tablet computer or a handheld computer, which will not be limited here.

In the embodiments of the present disclosure, a processing component, a memory component and a drive component may be configured in the electronic device. Optionally, the drive component and the processing component may be integrated with each other, the memory component may store an operating system, an application or other program modules, and the processing component may implement a method for text error correction in the embodiments of the present disclosure by executing an application stored in the memory component.

FIG. 1 is a flowchart illustrating a method for text error correction in embodiments of the present disclosure.

The method for text error correction in embodiments of the present disclosure may be executed by an apparatus for text error correction in embodiments of the present disclosure. The apparatus may be configured in the electronic device to achieve obtaining a text to be corrected and a pinyin sequence of the text to be corrected, and inputting the text to be corrected and the pinyin sequence to a text error correction model to obtain a corrected text.

As a possible situation, the method for text error correction in embodiments of the present disclosure may be executed on a server side. When the server is a cloud server, the method for text error correction may be executed on the cloud.

As illustrated in FIG. 1, the method for text error correction may include the blocks 101-103.

At block 101, a text to be corrected is obtained.

It should be noted that, the text to be corrected described in the embodiment may be a text represented in various written languages, for example, a Chinese text. The text to be corrected may include a sentence, a paragraph or a chapter, for example, a news release.

In the embodiment of the present disclosure, the text to be corrected may include the text information input by the user through the speech recognition, and the text information obtained in a way that the user inputs content to an input method system through an input method and the input content may be converted by the input method system into candidate word items of the input text based on the user's current input method for the user to select. The user may input the text information through various input means such as a keyboard, a touchpad, a mouse, etc., and through any input method such as a pinyin input method, a five-stroke input method, a stroke input method, a handwriting input method, etc., which will not be limited here.

As a possible situation, the above text to be corrected may further include the text information obtained by the user through copying and pasting.

Specifically, an electronic device may obtain the input content input by the user to an input method system through an input method, for example, the user inputs "他德语说得很好" through the input method.

At block 102, a pinyin sequence of a text to be corrected is obtained.

In the embodiment of the present disclosure, if the text to be corrected consists of Chinese characters, the pinyin of Chinese characters may be determined as the pinyin sequence of the text to be corrected; if the text to be corrected consists of Chinese characters and non-Chinese characters, the pinyin of Chinese characters and non-Chinese characters as whole may be determined as the pinyin sequence of the text to be corrected; the non-Chinese characters include numbers, English words and/or pinyin of Chinese characters.

For example, when the text to be corrected is "他德语说得很好", a pinyin sequence of the text to be corrected may be "ta de yu shuo de hen hao". For example, when the text to be corrected is "他 de yu 说得很好", a pinyin sequence of the text to be corrected may be "ta de yu shuo de hen hao". For example, when text to be corrected is "我老婆给了买了一双 adidas 运动鞋", a pinyin sequence of the text to be corrected may be "wo lao po gei wo mai le yi shuang adidas yun dong xie".

It should be noted that, a pinyin in the pinyin sequence described in the embodiment may be with a tone symbol, which is not illustrated in the above example.

As a possible situation, a text to be corrected may be input to a pinyin extraction model, and pinyin information of the text to be corrected is extracted from the pinyin extraction model, to obtain a pinyin sequence of the text to be corrected.

It should be noted that, a pinyin extraction model described in the embodiment may be pre-stored in a storage space of the electronic device for the convenience of calling applications. The storage space is not limited to a storage space based on an entity, for example, a hardware, and may further be a storage space (a cloud storage space) of a network hard disk connected to the electronic device.

At block 103, the text to be corrected and the pinyin sequence are input to a text error correction model, to obtain a corrected text.

It should be noted that, the text error correction model described in the embodiment may be trained in advance, and pre-stored in the storage space of the electronic device for the convenience of calling applications. In addition, the text error correction model described in the embodiment may be obtained by training a neural network model based on a training corpus, in which the neural network model may include a plurality of layers.

Specifically, when the electronic device obtains the text to be corrected and the pinyin sequence of the text to be corrected, the text to be corrected and the pinyin sequence of the text to be corrected may be input to a text error correction model, so that the text to be corrected and the pinyin sequence of the text to be corrected are processed by the text error correction model, to obtain a corrected text after correcting the text to be corrected.

In the embodiment of the present disclosure, a text to be corrected and a pinyin sequence of the text to be corrected are obtained, and the text to be corrected and its pinyin sequence are input to a text error correction model, to obtain a corrected text. Thus, a text may be efficiently corrected, further to improve the accuracy of the corrected text.

Figure 2:
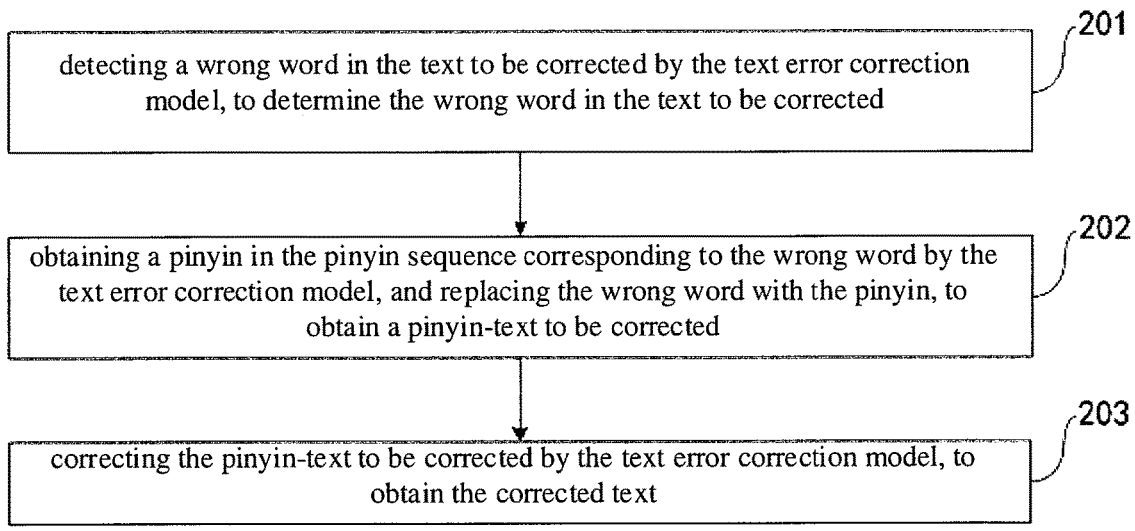
FIG. 2 is a flowchart illustrating generating a corrected text by a text correction model in embodiments of the present disclosure.

In order to clarify the above embodiment, in an embodiment of the present disclosure, inputting a text to be corrected and its pinyin sequence to a text error correction model to obtain a corrected text, may include: inputting a text to be corrected and its pinyin sequence to a text error correction model, and generating the corrected text by the text error correction model in the following blocks 201-203 as illustrated in FIG. 2.

At block 201, a wrong word in the text to be corrected is detected by the text error correction model, to determine the wrong word in the text to be corrected.

In the embodiment of the present disclosure, a text error correction model may include an encoder network layer in which the wrong word in the text to be corrected may be detected to determine the wrong word in the text to be corrected.

At block 202, the text error correction model obtains a pinyin in the pinyin sequence corresponding to the wrong word, and the wrong word is replaced with the pinyin to obtain a pinyin-text to be corrected. That is, the pinyin-text to be corrected is composed of the pinyin corresponding to the wrong word and other words in the text.

At block 203, the pinyin-text to be corrected is corrected by the text error correction model to obtain a corrected text.

In the embodiment of the present disclosure, a text error correction model may further include an error correction network layer in which the pinyin-text to be corrected is corrected to obtain the corrected text.

Specifically, when the electronic device obtains a text to be corrected and a pinyin sequence of the text to be corrected, the text to be corrected and the pinyin sequence of the text to be corrected may be input to a text error correction model, and a wrong word in the text to be corrected is detected through the encoder network layer. After the wrong word in the text to be corrected is determined, an error detection labeling sequence corresponding to the text to be corrected one by one may be generated, in which the error detection labeling sequence may be a labeling sequence with two labeling types. For example, the error detection labeling sequence includes the labeling type 0 and the labeling type 1, and each word in the text to be corrected only corresponds to one labeling type, the labeling type 0 represents the corresponding words have no problem (for example, a light circle in the error correction labeling sequence in FIG. 3), and the labeling type 1 represents the corresponding words have problems (for example, a dark circle in the error correction labeling sequence in FIG. 3) shall be corrected.

Figure 3:
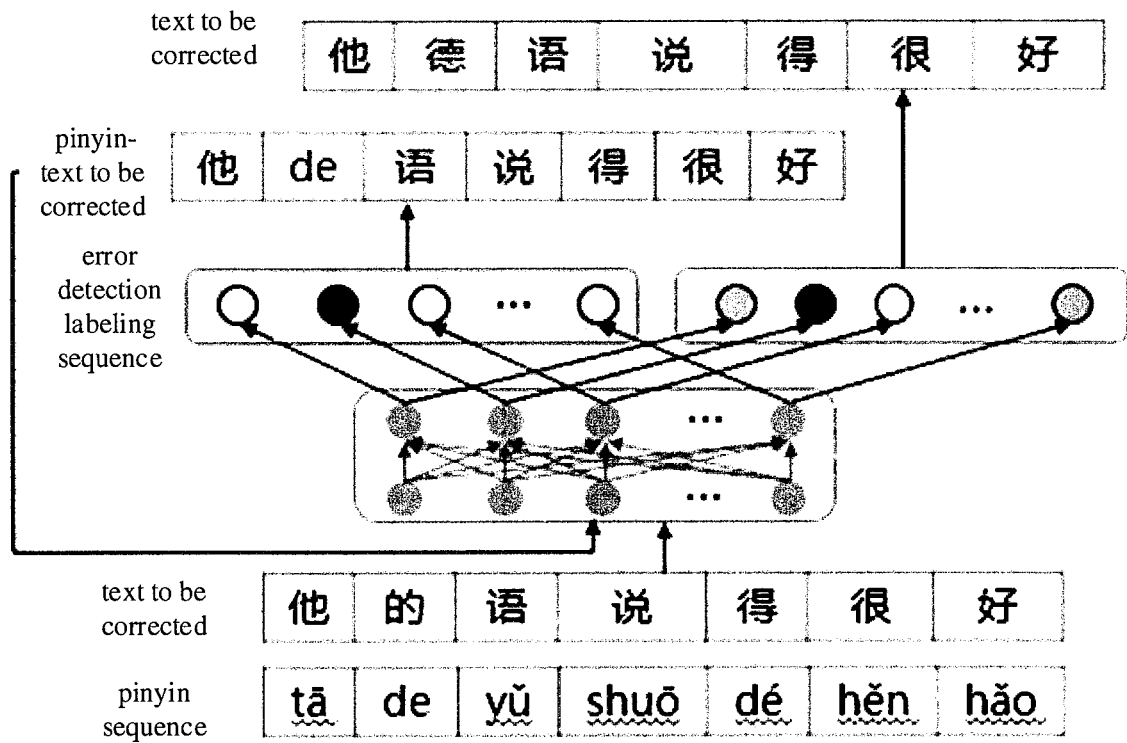
FIG. 3 is a logic diagram illustrating a method for text error correction in embodiments of the present disclosure.

After the wrong word in the text to be corrected is determined and the error correction labeling sequence is obtained, a pinyin in the pinyin sequence corresponding to the wrong word may be obtained on the basis of the wrong labeling type in the error correction labeling sequence, and the wrong word in the text to be corrected is replaced with said pinyin, to obtain a pinyin-text to be corrected, for example, the pinyin-text to be corrected "他" de 语说得很好 in FIG. 3. Then, the pinyin-text to be corrected is corrected by the error correction network layer in the text error correction model to obtain a corrected text, for example, the corrected text "他德语说得很好" in FIG. 3. Thus, through the text error correction model described above, a candidate generation which may lead to false recalling and missing recalling in the related art are removed, which avoids the problems caused by inaccurate prefix confusion set.

In order to clarify the above embodiment, in an embodiment of the present disclosure, a pinyin-text to be corrected may be obtained by the following formula:

$$X_{wp}=W_w*O_{det}+X_p*(1-O_{det}) \quad (1)$$

where the $X_{wp}$ may be the pinyin-text to be corrected, the $W_w$ may be the text to be corrected, the $X_p$ may be the pinyin sequence, the $O_{det}$ may be an error detection labeling sequence of the text to be corrected, and the error detection labeling sequence corresponds to the text to be corrected one by one.

Specifically, after the wrong word in the text to be corrected is determined and the error correction labeling sequence is obtained, the wrong word in the text to be corrected may be replaced with said pinyin in the corresponding pinyin sequence by the above formula (1), to obtain a pinyin-text to be corrected, thus accurately obtaining a pinyin-text to be corrected and improving the accuracy of text error correction.

Figure 4:
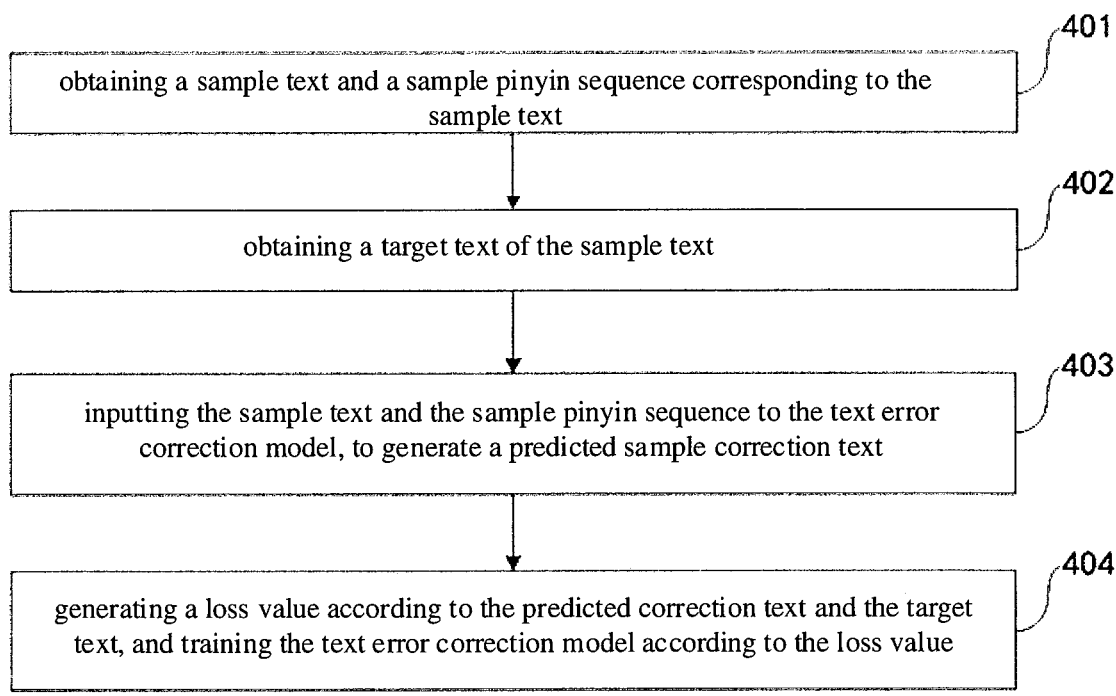
FIG. 4 is a flowchart illustrating another method for text error correction in embodiments of the present disclosure.

In order to further improve the accuracy of text error correction, in an embodiment of the present disclosure, as illustrated in FIG. 4, the text error correction model may be obtained by training in the following blocks 401-404.

At block 401, a sample text and a sample pinyin sequence corresponding to the sample text are obtained. There may be a plurality of sample texts and their corresponding sample pinyin sequences.

In the embodiment of the present disclosure, there are multiple methods to obtain the sample text and its corresponding sample pinyin sequence. For example, the text and its corresponding pinyin sequence that are collected each time the electronic device performs the text error correction may be taken as the sample text and its corresponding sample pinyin sequence, or a professional sample text and its corresponding sample pinyin sequence are directly provided by the engineer, which will not be limited here.

At block 402, a target text of the sample text is obtained.

In the embodiment of the present disclosure, a target text of the sample text may be provided by the engineer in charge of training.

At block 403, the sample text and the sample pinyin sequence are input to the text error correction model, to generate a predicted sample correction text.

At block 404, a loss value is generated according to the predicted correction text and the target text, and the text error correction model is trained according to the loss value.

Specifically, after a sample text, a sample pinyin sequence corresponding to the sample text and a target text of the sample text are obtained, the sample text and the sample pinyin sequence may be input to the text error correction model to generate a predicted sample correction text, and a loss value may be generated according to the predicted correction text and the target text, and the text error correction model may be trained according to the loss value, thereby optimizing the text error correction model and improving the accuracy of text error correction.

In the embodiment of the present disclosure, training and generation of the text error correction model may be performed by a relevant server. The server may be a cloud server, and also may be a host of a computer. The server establishes a communication connection with the electronic device that may be provided to execute the embodiment of the disclosure, and the communication connection may be at least one of wireless network connection and wired network connection. The server may send a trained text error correction model to the electronic device so that the electronic device may call it when necessary, thus greatly reducing computing pressure of the electronic device.

Figure 5:
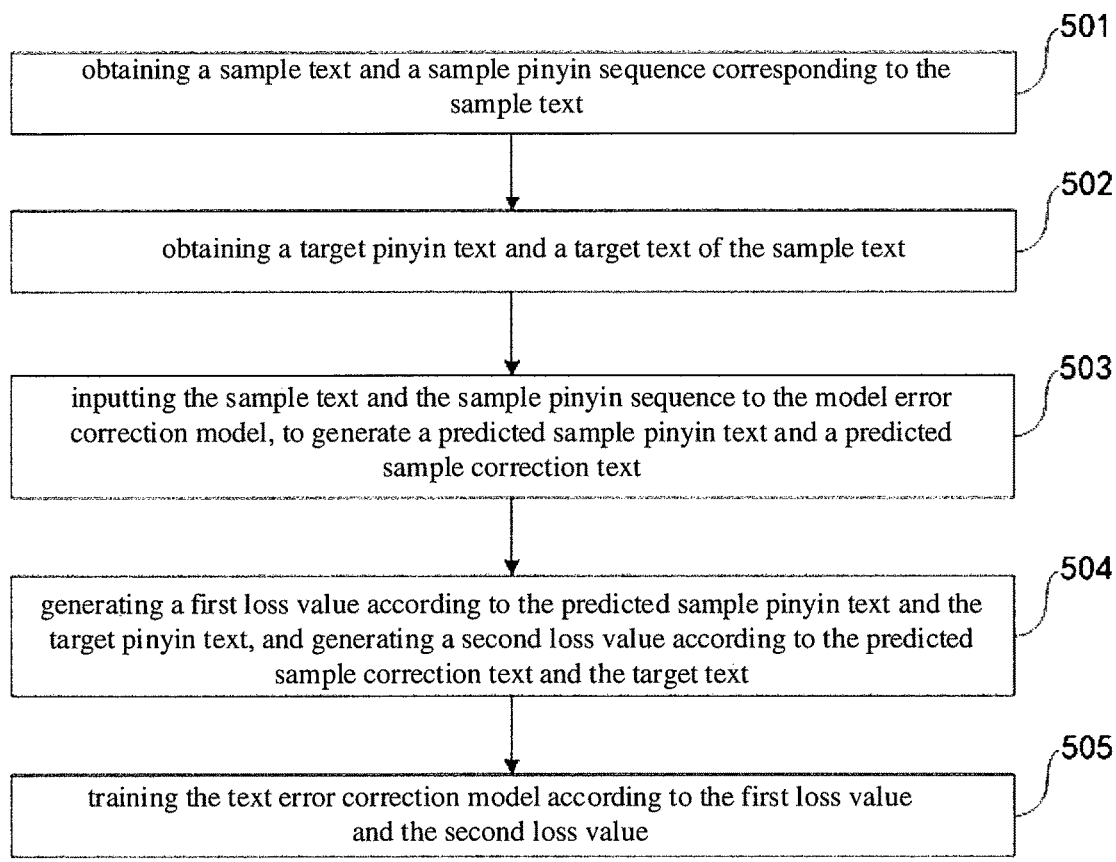
FIG. 5 is a flowchart illustrating another method for text error correction in embodiments of the present disclosure.

In another embodiment of the present disclosure, as illustrated in FIG. 5, a text error correction model may be trained in the following blocks 501-505.

At block 501, a sample text and a sample pinyin sequence corresponding to the sample text are obtained. There may be a plurality of sample texts and their corresponding sample pinyin sequences.

In the embodiment of the present disclosure, there are multiple methods to obtain the sample text and its corresponding sample pinyin sequence. For example, the text and its corresponding pinyin sequence that are collected each time the electronic device performs the text error correction may be taken as the sample text and its corresponding sample pinyin sequence, or a professional sample text and its corresponding sample pinyin sequence are directly provided by the engineer, which will not be limited here.

At block 502, a target pinyin text and a target text of the sample text are obtained.

In the embodiment of the present disclosure, the target pinyin text and the target text of a sample text may be provided by the engineer in charge of training.

At block 503, the sample text and the sample pinyin sequence are input to the text error correction model, to generate a predicted sample pinyin text and a predicted sample correction text.

In the embodiment of the present disclosure, the relevant training engineer may cause the text error correction model via technical means to output the sample pinyin text generated during the work process of the text error correction model together with the finally outputted sample correction text.

At block 504, a first loss value is generated according to the predicted sample pinyin text and the target pinyin text, and a second loss value is generated according to the predicted sample correction text and the target text.

At block 505, a text error correction model is trained according to the first loss value and the second loss value.

Specifically, after a sample text and a sample pinyin sequence corresponding to the sample text, a target pinyin text and a target text of the sample text are obtained, the sample text and the sample pinyin sequence may be input to the text error correction model to generate a predicted sample pinyin text and a predicted sample correction text; then a first loss value is generated according to the predicted sample pinyin text and the target pinyin text, and a second loss value is generated according to the predicted sample correction text and the target sample text; and, the text error correction model is trained according to the first loss value and the second loss value. Thus, the final output result of the text error correction model and the sample pinyin text generated during the work process of the text error correction model are trained simultaneously, further to optimize the text error correction model and greatly improve the accuracy of text error correction.

In an embodiment of the present disclosure, the above sample text may include one or more of a masked sample text, a sample text with confusing words and a pinyin sample text with confusing words. For example, a masked sample text for "他德语说得很好" may include "他 [MASK] [MASK] 说得很好"; a sample text with confusing words for "他德语说得很好" may include "他德语说得很好"; a pinyin sample text for "他德语说得很好" may include " 他 déyǔ 说 得很好 ". Thus, the sample error correction model may be trained by obtaining different kinds of samples, thus greatly optimizing the accuracy of the text error correction model.

Figure 6:
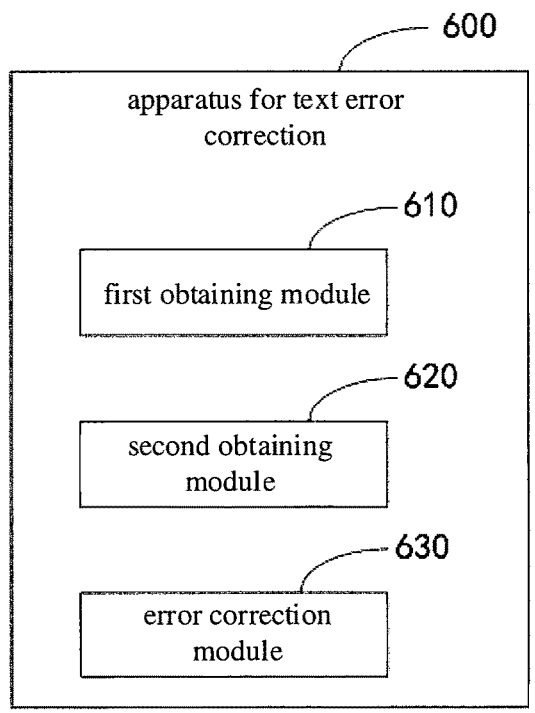
FIG. 6 is a schematic diagram illustrating a structure of an apparatus for text error correction in embodiments of the present disclosure.

FIG. 6 is a schematic diagram illustrating a structure of an apparatus for text error correction in embodiments of the present disclosure.

The apparatus for text error correction in embodiments of the present disclosure may be configured in the electronic device to achieve obtaining a text to be corrected and a pinyin sequence of the text to be corrected, and inputting the text to be corrected and the pinyin sequence to a text error correction model to obtain a corrected text.

As illustrated in FIG. 6, the apparatus 600 for text error correction may include a first obtaining module 610, a second obtaining module 620 and an error correction module 603.

The first obtaining module 610 is configured to obtain a text to be corrected. It should be noted that, the text to be corrected described in the embodiment may be a text represented in various written languages, for example, a Chinese text. The text to be corrected may include a sentence, a paragraph or a chapter, for example, a news release.

In the embodiment of the present disclosure, a correction text may include the text information input by the user through the speech recognition, and the text information obtained in a way that the user inputs content to an input method system through an input method and the input content may be converted by the input method system into candidate word items of the input text based on the user's current input method for the user to select. The user may input the text information through various input means such as a keyboard, a touchpad, a mouse, etc., and through any input method such as a pinyin input method, a five-stroke input method, a stroke input method, a handwriting input method, etc., which will not be limited here.

As a possible situation, the above text to be corrected may further include the text information obtained by the user through copying and pasting.

Specifically, the first obtaining module 610 may obtain the input content input by the user to an input method system through an input method, for example, the user inputs "他德语说得很好" by an input method.

The second obtaining module 620 is configured to obtain a pinyin sequence of the text to be corrected.

In the embodiment of the present disclosure, if the text to be corrected consists of Chinese characters, the second obtaining module 620 may determine the pinyin of Chinese characters as the pinyin sequence of the text to be corrected; if the text to be corrected consists of Chinese characters and non-Chinese characters, the second obtaining module 620 may determine the pinyin of Chinese characters and non-Chinese characters as whole as the pinyin sequence of the text to be corrected; in which, non-Chinese characters include numbers, English words and/or pinyin of Chinese characters.

For example, when the text to be corrected is "他德语说得很好", a pinyin sequence of the text to be corrected may be "ta de yu shuo de hen hao". For example, when the text to be corrected is "他 de yu 说得很好", a pinyin sequence of the text to be corrected may be "ta de yu shuo de hen hao". For example, when text to be corrected is "我老婆给了买了一双 adidas 运动鞋", a pinyin sequence of the text to be corrected may be "wo lao po gei wo mai le yi shuang adidas yun dong xie".

It should be noted that, a pinyin in the pinyin sequence described in the embodiment may be with a tone symbol, which is not illustrated in the above example.

As a possible situation, the second obtaining module 620 may input a text to be corrected to a pinyin extraction model, and extract pinyin information of the text to be corrected from the pinyin extraction model, to obtain a pinyin sequence of the text to be corrected.

It should be noted that, a pinyin extraction model described in the embodiment may be pre-stored in the storage space of the electronic device for the convenience of calling applications. The storage space is not limited to a storage space based on an entity, for example, a hardware, and may further be a storage space (a cloud storage space) of a network hard disk connected to the electronic device.

The error correction module 630 is configured to input the text to be corrected and the pinyin sequence to a text error correction model, to obtain a corrected text.

It should be noted that, the text error correction model described in the embodiment may be trained in advance, and pre-stored in the storage space of the electronic device for the convenience of calling applications. In addition, the text error correction model described in the embodiment may be obtained by training a neural network model based on a training corpus, in which the neural network model may include a plurality of layers.

Specifically, when the first obtaining module 610 obtains a text to be corrected and the second obtaining module 620 obtains a pinyin sequence of the text to be corrected, the error correction module 630 may input the text to be corrected and the pinyin sequence of the text to be corrected to a text error correction model, so that the text error correction model deals with the text to be corrected and the pinyin sequence of the text to be corrected, to obtain a corrected text after correcting the text to be corrected.

In the embodiment of the present disclosure, a text to be corrected is obtained by the first obtaining module and a pinyin sequence of the text to be corrected is obtained by the second obtaining module, and the text to be corrected and the pinyin sequence are input to a text error correction model by the error correction module, to obtain a corrected text. Thus, a text may be efficiently corrected, further to improve the accuracy of the corrected text.

In an embodiment of the present disclosure, as illustrated in FIG. 6, the error correction module 630 may be configured to input the text to be corrected and the pinyin sequence to the text error correction model and generate the corrected text with the text error correction model by: detecting a wrong word in the text to be corrected by the text error correction model, to determine the wrong word in the text to be corrected; obtaining a pinyin in the pinyin sequence corresponding to the wrong word by the text error correction model, and replacing the wrong word with the pinyin, to obtain a pinyin-text to be corrected; and correcting the pinyin-text to be corrected by the text error correction model, to obtain the corrected text. It should be noted that, the text error correction model in the embodiment may be configured in the apparatus 600 for text error correction for the convenience of recalling at any time by the apparatus 600 for text error correction.

In an embodiment of the present disclosure, a text error correction model may obtain a pinyin-text to be corrected by the formula: $X_{wp}=W_w*O_{det}+X_p*(1-O_{det})$, in which, the $X_{wp}$ may be the pinyin-text to be corrected, the $W_w$ may be the text to be corrected, the $X_p$ may be the pinyin sequence, the $O_{det}$ may be an error detection labeling sequence of the text to be corrected, and the error detection labeling sequence corresponds to the text to be corrected one by one.

Figure 7:
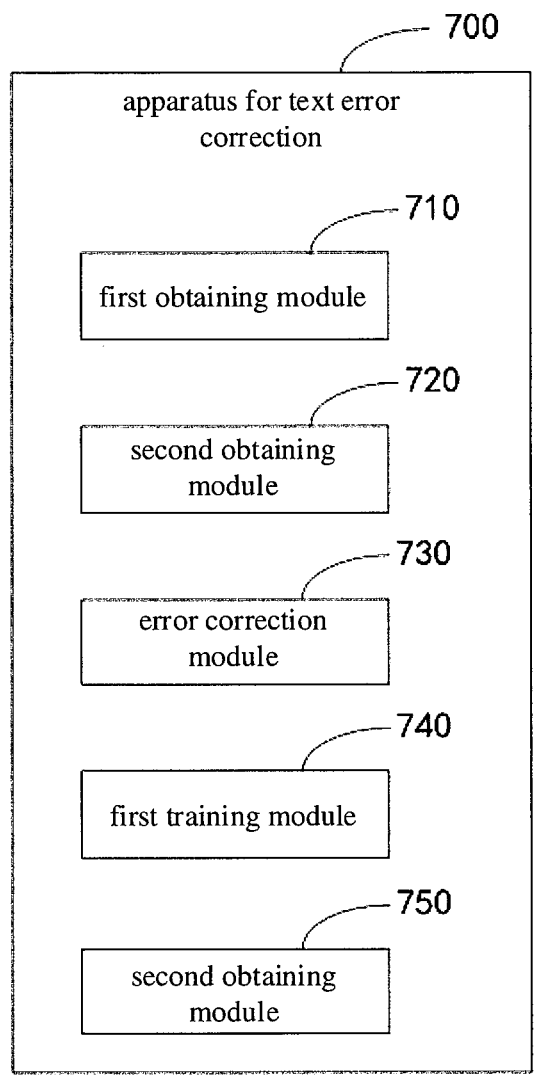
FIG. 7 is a schematic diagram illustrating a structure of another apparatus for text error correction in embodiments of the present disclosure.

In another embodiment of the present disclosure, as illustrated in FIG. 7, an apparatus 700 for text error correction may include a first obtaining module 710, a second obtaining module 720, an error correction module 730 and a first training module 740. The first training module 740 is configured to obtain a sample text and a sample pinyin sequence corresponding to the sample text; obtain a target text of the sample text; input the sample text and the sample pinyin sequence to the text error correction model, to generate a predicted sample correction text; and generate a loss value according to the predicted correction text and the target text, and train the text error correction model according to the loss value.

It should be noted that, the first obtaining module 610 and the first obtaining module 710, the second obtaining module 620 and the second obtaining module 720, the error correction module 630 and the error correction module 730 as described in the above embodiment may have the same functions and structures.

In another embodiment of the present disclosure, as illustrated in FIG. 7, an apparatus 700 for text error correction may include a second training module 750. The second training module 750 is configured to obtain a sample text and a sample pinyin sequence corresponding to the sample text; obtain a target pinyin text and a target sample of the sample text; input the sample text and the sample pinyin sequence to the text error correction model, to generate a predicted sample pinyin text and a predicted sample correction text; generate a first loss value according to the predicted sample pinyin text and the target pinyin text, and generate a second loss value according to the predicted sample correction text and the target sample text; and, train the text error correction model according to the first loss value and the second loss value.

In an embodiment of the present disclosure, the sample text may include one or more of a masked sample text, a sample text with confusing words and a pinyin sample text with confusing words.

It should be noted that the foregoing explanation of the embodiment of a method for text error correction also applies to an apparatus for text error correction in this embodiment, which will not be repeated here.

The apparatus for text error correction in the embodiment of the present disclosure may obtain a text to be corrected by the first obtaining module, obtain a pinyin sequence of the text to be corrected by the second obtaining module, and input the text to be corrected and the pinyin sequence to a text error correction model by the error correction module, to obtain a corrected text. Thus, a text may be efficiently corrected, further to improve the accuracy of the corrected text.

Figure 8:
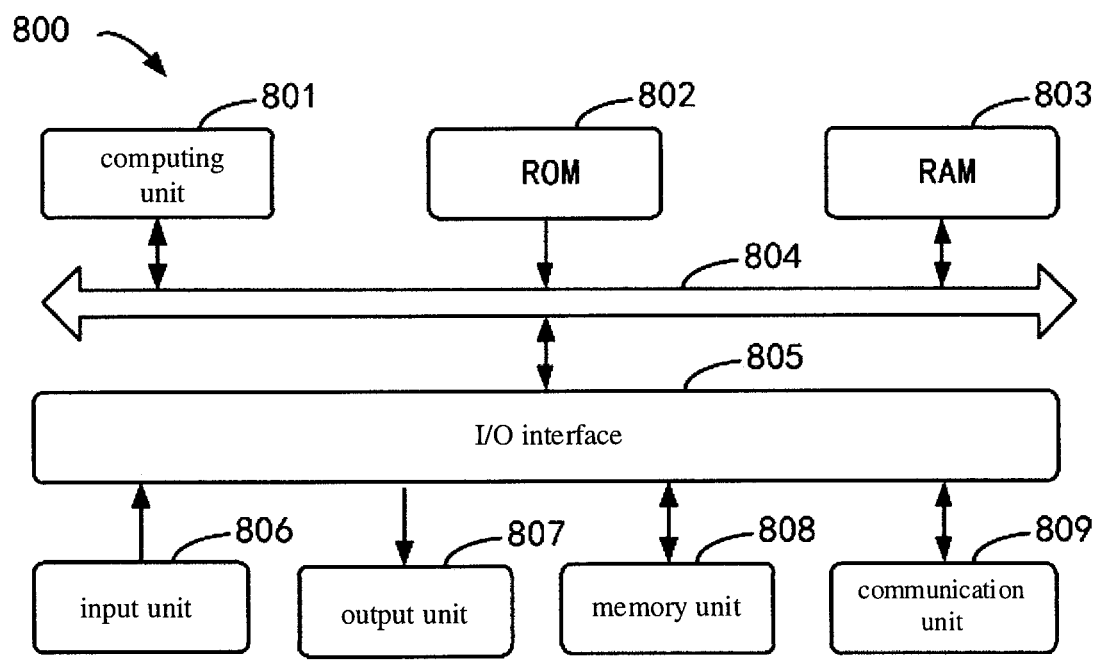
FIG. 8 is a block diagram illustrating an electronic device in a method for text error correction in embodiments of the present disclosure.

In the embodiment of the present disclosure, an electronic device, a readable storage medium and a computer program product are further provided according to embodiments of the present disclosure FIG. 8 is a schematic block diagram illustrating an example electronic device 800 in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components illustrated herein, their connections and relations, and their functions are merely examples, and are not intended to limit the implementation of the disclosure described and/or required herein.

As illustrated in FIG. 8, a device 800 includes a computing unit 801, configured to execute various appropriate actions and processes according to a computer program stored in a read-only memory (ROM) 802 or loaded from a memory unit 808 to a random access memory (RAM) 803. In a RAM 803, various programs and data required for a device 800 may be stored. A computing unit 801, a ROM 802 and a ROM 803 may be connected with each other by a bus 804. An input/output (I/O) interface 808 is also connected to a bus 804.

Multiple components in the device 800 are connected to an I/O interface 808, and includes: an input unit 806, for example, a keyboard, a mouse, etc.; an output unit 807, for example various types of displays, speakers; a memory unit 808, for example a magnetic disk, an optical disk; and a communication unit 809, for example, a network card, a modem, a wireless transceiver. A communication unit 809 allows a device 800 to exchange information/data through a computer network such as internet and/or various types of telecommunication networks and other devices.

A computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 801 executes various methods and processes as described above, for example, a method for text error correction. For example, in some embodiments, a method for text error correction may be further implemented as a computer software program, which is physically contained in a machine readable medium, such as a memory unit 808. In some embodiments, a part or all of the computer program may be loaded and/or installed on the device 800 through a ROM 802 and/or a communication unit 809. When the computer program is loaded on a RAM 803 and executed by a computing unit 801, one or more blocks in the method for text error correction as described above may be performed. Alternatively, in other embodiments, a computing unit 801 may be configured to execute a method for text error correction in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SOC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server. In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN) and an internet, an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures illustrated above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for text error correction, comprising:
obtaining a text to be corrected;
obtaining a pinyin sequence of the text to be corrected; and
inputting the text to be corrected and the pinyin sequence to a text error correction model, to obtain a corrected text;
wherein, inputting the text to be corrected and the pinyin sequence to the text error correction model, to obtain the corrected text, comprises:
detecting a wrong word in the text to be corrected by the text error correction model, to determine the wrong in the text to be corrected;
obtaining a pinyin in the pinyin sequence corresponding to the wrong word by the text error corrected model, and replacing the wrong with the pinyin, to obtain a pinyin-text to be corrected;
correcting the pinyin-text to be corrected by the text error correction model, to obtain the corrected text; and
obtaining the pinyin-text to be corrected by the formula:
$X_{wp}=W_w*O_{det}+X_p*(1-O_{det})$,
where $X_{wp}$ is the pinyin-text to be corrected, $W_w$ is the text to be corrected, $X_p$ is the pinyin sequence, $O_{det}$ is an error detection labeling sequence of the text to be corrected, and the error detection labeling sequence corresponds to the text to be corrected one by one.

2. The method of claim 1, wherein, training the text error correction model by:
obtaining a sample text and a sample pinyin sequence corresponding to the sample text;
obtaining a target text of the sample text;
inputting the sample text and the sample pinyin sequence to the text error correction model, to generate a predicted sample correction text; and
generating a loss value according to the predicted sample correction text and the target text, and training the text error correction model according to the loss value.

3. The method of claim 1, wherein, training the text error correction model by:
obtaining a sample text and a sample pinyin sequence corresponding to the sample obtaining a target pinyin text and a target text of the sample text;
inputting the sample text and the sample pinyin sequence to the model error correction model, to generate a predicted sample pinyin text and a predicted sample correction text;
generating a first loss value according to the predicted sample pinyin text and the target pinyin text, and generating a second loss value according to the predicted sample correction text and the target text; and
training the text error correction model according to the first loss value and the second loss value.

4. The method of claim 3, wherein, the sample text comprises one or more of a masked sample text, a sample text with confusing words and a pinyin sample text with confusing words.

5. An electronic device, comprising:
at least one processor; and
a memory communicatively coupled to the at least one processor;
wherein the at least one processor is configured to:
obtain a text to be corrected;
obtain a pinyin sequence of the text to be corrected; and
input the text to be corrected and the pinyin sequence to a text error correction model, to obtain a corrected text;
wherein the at least one processor is further configured to:
detect a wrong word in the text to be corrected by the text error correction model, to determine the wrong word in the text to be corrected;
obtain a pinyin in the pinyin sequence corresponding to the wrong word by the text error correction model, and replacing the wrong word with the pinyin, to obtain a pinyin-text to be corrected; and
correct the pinyin-text to be corrected by the text error correction model, to obtain the corrected text;
wherein the pinyin-text to be corrected is obtained by the formula:
$X_{wp}=W_w*O_{det}+X_p*(1-O_{det})$,
where $X_{wp}$ is the pinyin-text to be corrected, $W_w$ is the text to be corrected, $X_p$ is the pinyin sequence, $O_{det}$ is an error detection labeling sequence of the text to be corrected, and the error detection labeling sequence corresponds to the text to be corrected one by one.

6. The electronic device of claim 5, wherein the at least one processor is further configured to:
obtain a sample text and a sample pinyin sequence corresponding to the sample text;
obtain a target text of the sample text; input the sample text and the sample pinyin sequence to the text error correction model, to generate a predicted sample correction text; and
generate a loss value according to the predicted sample correction text and the target text, and train the text error correction model according to the loss value.

7. The electronic device of claim 5, wherein the at least one processor is further configured to:
obtain a sample text and a sample pinyin sequence corresponding to the sample text;
obtain a target pinyin text and a target sample of the sample text;
input the sample text and the sample pinyin sequence to the text error correction model, to generate a predicted sample pinyin text and a predicted sample correction text;
generate a first loss value according to the predicted sample pinyin text and the target pinyin text, and generate a second loss value according to the predicted sample correction text and the target sample text; and
train the text error correction model according to the first loss value and the second loss value.

8. The electronic device of claim 7, wherein the sample text comprises one or more of a masked sample text, a sample text with confusing words and a pinyin sample text with confusing words.

9. A non-transitory computer-readable storage medium having computer instructions stored thereon, wherein the computer instructions are configured to cause a computer to execute a method for text error correction, the method comprising:

obtaining a text to be corrected;

obtaining a pinyin sequence of the text to be corrected; and inputting the text to be corrected and the pinyin sequence to a text error correction model, to obtain a corrected text;

wherein, inputting the text to be corrected and the pinyin sequence to the text error correction model, to obtain the corrected text, comprises:

detecting a wrong word in the text to be corrected by the text error correction model, to determine the wrong word in the text to be corrected;

obtaining a pinyin in the pinyin sequence corresponding to the wrong word by the text error correction model, and replacing the wrong word with the pinyin, to obtain a pinyin-text to be corrected;

correcting the pinyin-text to be corrected by the text error correction model, to obtain the corrected text; and obtaining the pinyin-text to be corrected by the formula: $X_{wp}=W_w*O_{det}+X_p*(1-O_{det})$, where $X_{wp}$ is the pinyin-text to be corrected, $W_w$ is the text to be corrected, $X_p$ is the pinyin sequence, $O_{det}$ is an error detection labeling sequence of the text to be corrected, and the error detection labeling sequence corresponds to the text to be corrected one by one.

10. The storage medium of claim 9, wherein, training the text error correction model by:

obtaining a sample text and a sample pinyin sequence corresponding to the sample text;

obtaining a target text of the sample text;

inputting the sample text and the sample pinyin sequence to the text error correction model, to generate a predicted sample correction text; and generating a loss value according to the predicted sample correction text and the target text, and training the text error correction model according to the loss value.

11. The storage medium of claim 9, wherein, training the text error correction model by:

obtaining a sample text and a sample pinyin sequence corresponding to the sample text;

obtaining a target pinyin text and a target text of the sample text;

inputting the sample text and the sample pinyin sequence to the model error correction model, to generate a predicted sample pinyin text and a predicted sample correction text;

generating a first loss value according to the predicted sample pinyin text and the target pinyin text, and generating a second loss value according to the predicted sample correction text and the target text; and training the text error correction model according to the first loss value and the second loss value.

12. The storage medium of claim 11, wherein, the sample text comprises one or more of a masked sample text, a sample text with confusing words and a pinyin sample text with confusing words.

\* \* \* \* \*